United States Patent [19]
Mamyshev et al.

[11] Patent Number: 6,147,788
[45] Date of Patent: Nov. 14, 2000

[54] GUIDING FILTERS FOR WAVELENGTH DIVISION MULTIPLEXING IN SOLITON TRANSMISSION

[75] Inventors: Pavel Viktorovich Mamyshev, Middletown Township, Monmouth County; Linn Frederick Mollenauer, Colts Neck Township, Monmouth County; Thomas A. Strasser, Warren Township, Somerset County, all of N.J.

[73] Assignee: Lucent Technologies Inc, Murray Hill, N.J.

[21] Appl. No.: 09/080,551

[22] Filed: May 18, 1998

Related U.S. Application Data
[60] Provisional application No. 60/049,791, Jun. 16, 1997.

[51] Int. Cl.⁷ .................................................. H04B 10/12
[52] U.S. Cl. .......................... 359/173; 359/117; 359/124; 385/24; 385/37
[58] Field of Search .................................. 359/124, 117, 359/173; 385/24, 37

[56] References Cited

U.S. PATENT DOCUMENTS

| | | | |
|---|---|---|---|
| 5,119,454 | 6/1992 | McMahon | 385/49 |
| 5,233,453 | 8/1993 | Sivarajan et al. | 359/117 |
| 5,305,335 | 4/1994 | Ball et al. | 372/6 |
| 5,357,364 | 10/1994 | Gordon et al. | 359/173 |
| 5,463,489 | 10/1995 | Mamyshev et al. | 359/173 |
| 5,546,485 | 8/1996 | Darcie | 385/28 |
| 5,557,441 | 9/1996 | Mollenauer | 359/173 |
| 5,557,468 | 9/1996 | Ip | 359/615 |
| 5,642,215 | 6/1997 | Suzuki et al. | 359/161 |

OTHER PUBLICATIONS

B. T. Sullivan et al entitled "Manufacture of complex optical multilayer filters using an automated deposition system" ISSP'97, Jun. 97, Kanazawa, Japan., 11 pages.

P.V. Mamyshev, et al, "Stability of soliton propagation with sliding–frequency guiding filters" Optics Letters/vol. 19, No. 24/Dec. 15, 1994, pp. 2083–2085.

*Primary Examiner*—Leslie Pascal
*Assistant Examiner*—Hanh Phan
*Attorney, Agent, or Firm*—John A. Caccuro

[57] ABSTRACT

In soliton transmission, third order dispersion of the transmission fibers tends to cause unacceptable variation in the filter strength parameter, $\eta$ over the wide wavelength bands required for massive wavelength division multiplexing (WDM). The effect of dispersion is substantially eliminated by varying the mirror reflectivities $R(\lambda)$ of etalon filters with wavelength, such that the strength ($\eta$) parameter, in soliton units, essentially remains at the optimal value across the entire WDM transmission band.

17 Claims, 5 Drawing Sheets

6,147,788

GUIDING FILTERS FOR WAVELENGTH DIVISION MULTIPLEXING IN SOLITON TRANSMISSION

RELATED APPLICATIONS

This application is based on a provisional application, serial number 60/049,791 filed on Jun. 16, 1997 and entitled "GUIDING FILTERS FOR MASSIVE WAVELENGTH DIVISION MULTIPLEXING IN SOLITON TRANSMISSION."

TECHNICAL FIELD OF THE INVENTION

This invention relates to soliton optical communication systems and, more particularly, to an etalon filter design for use in such systems.

BACKGROUND OF THE INVENTION

The vast potential of optical solitons is being harnessed in today's optical communication systems. In such systems it is also well understood that sliding-frequency guiding filters [1] provide many powerful benefits for long-distance soliton transmission, the most fundamental of these being strong reduction of both amplitude and timing jitter [2], and the steady elimination of non-soliton fields. (Note in the following description a reference's identification [e.g., 2] refers to that reference's . listed in the Appendix) For wavelength division multiplexing (WDM), these guiding filters additionally supply automatic leveling of the relative channel signal strengths in the face of variation of amplifier gain with wavelength [3], and they provide for equally vital reduction of collision-induced timing shifts [4,5]. Thus, recent demonstrations [6,7] of massive WDM at 10 Gbit/s per channel, error free over transoceanic distances, have depended heavily on the filters, and would have been almost unthinkable without them. Nevertheless, in those experiments the maximum number of channels was limited to about 8 by the fact that third order dispersion of the transmission fibers tends to cause a significant variation, with wavelength, in the filter strength parameter away from the optimum [8]. What is desired is a technique to maximize the number of WDM channels that can be sent over a soliton based optical communication system.

SUMMARY OF THE INVENTION

The present invention is directed to compensating for the effects on etalon guiding filter strength caused by the change in fiber dispersion across the band of wavelengths used for massive WDM, by appropriately varying the reflectivities $R(\lambda)$ of the etalon filter mirrors with wavelength. By using etalon filters which have mirror reflectivities $R(\lambda)$ which vary with wavelength in a predetermined manner, the resulting field strength ($\eta$) parameter, in soliton units, can be maintained essentially at an optimal value across the entire WDM transmission band.

More particularly, our method of making an etalon filter for filtering a Wavelength Division Multiplexed (WDM) optical soliton signal comprises the steps of (1) determining how the average dispersion (D) parameter of the fiber varies with wavelength and (2) calculating an appropriate variation in the reflectivity (R) of each mirror surface of the etalon filter to provide for an approximately constant filter strength ($\eta$) parameter as a function of wavelength. According to one feature, $\eta$ is assumed to scale approximately as R/D, where R<<than 1. According to other features $\eta$ is assumed to be (1) approximately R/D multiplied by a predetermined correction factor which varies as a function of the pulse width of the soliton signal and (2) the pulse width is assumed to vary as a function of $D^{1/3}$.

One etalon filter embodiment comprises (1) a first mirror, having a wavelength dependent reflectivity (R), for receiving the soliton signal (2) a second mirror, having said wavelength dependent reflectivity (R) and located a predetermined distance from the first mirror, the mirror pair or etalon filter producing therefrom a corrected soliton signal and wherein said reflectivity (R) characteristic is selected so that the strength ($\eta$) parameter as a function of wavelength is approximately constant over all the wavelengths of the WDM soliton signal.

Another etalon filter embodiment comprises (1) a first Bragg grating formed on the fiber, having a wavelength dependent reflectivity (R) characteristic, for receiving the soliton signal and (2) a second Bragg grating formed on the fiber, having said wavelength dependent reflectivity (R) characteristic and located a predetermined distance from the first Bragg grating, the Bragg grating mirror pair producing therefrom a corrected soliton signal and wherein said reflectivity (R) characteristic is selected so that the ratio of R/D, where D is an average dispersion (D) parameter over the fiber, remains essentially constant over all the wavelengths of the WDM soliton signal.

According to another aspect of the invention, an etalon filter unit comprises a WDM filter for splitting the soliton signal into a plurality of signal bands. Each signal band is processed by a separate etalon filter unit including (a) a first mirror, having a wavelength dependent reflectivity (R) characteristic, for receiving the soliton signal, and (b) a second mirror, having said wavelength dependent reflectivity (R) characteristic and located a predetermined distance from the first mirror, for receiving the signal and producing therefrom a corrected soliton signal and said reflectivity (R) characteristic is selected so that the field strength ($\eta$) parameter as a function of wavelength ratio is approximately constant over all the wavelengths of the band. A WDM combiner then combines the corrected soliton signals from each band into a combined corrected soliton signal.

DETAILED DESCRIPTION

In the following description, each item or block of each figure has a reference designation associated therewith, the first number of which refers to the figure in which that item is first located (e.g., 101 is located in FIG. 1).

Figure 1:
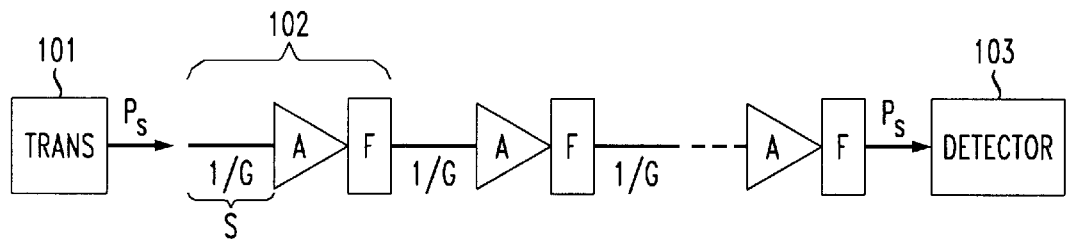
FIG. 1 shows a block diagram of an illustrative soliton optical communication system in which the present invention may be utilized.

Shown in FIG. 1 is a block diagram of an illustrative soliton optical communication system in which the present invention may be utilized. A transmitter unit 101 transmits a WDM soliton optical signal at power level $P_S$ over a multiple-segment all-optical transmission system. Each segment 102 includes an optical transmission fiber S having a length $L_{amp}$ and a loss $1/G$, an amplifier A having a gain $G \cdot G_{FILTER}$, and an etalon filter F having a loss $1/G_{FILTER}$. Since each segment has unity gain, the signal power $P_s$ is outputted from the last segment and received at detector 103. It is well known that the noise grows in such a system in direct proportion to the number of segments (amplifiers) in the system. To circumvent this cumulative growth in the noise level, the peak frequencies of the etalon filters F of successive segments are made to translate or slide, i.e., they increase at a predetermined frequency-sliding rate. The use of frequency-sliding filters enables the noise to be attenuated, while the soliton signals are not, thereby preventing the cumulative increase in the noise level. Such a technique has enabled the use of stronger filters which has resulted in the reduction of signal jitter. As has previously been described above, the inability of the filters to compensate for the third order dispersion of the transmission fibers has limited the number of wavelength channels that can be effectively used in these WDM soliton systems.

It is a object of the present invention to substantially eliminate the effects of this dispersion, through compensating variation (with wavelength) of the reflectivities of the mirrors used in the (Fabry-Perot) etalon filters.

In the simplest theoretical treatment, the filtering is regarded as continuous, and produces an energy loss per unit distance given by $$\frac{1}{W}\frac{dW}{dz} = -\eta(\omega - \omega_f)^2 \quad (1)$$

where W is the energy of a pulse whose bandwidth is much less than that of the filter, where $\omega_f$ is the filter peak frequency, and where $\eta$ is known as the filter strength parameter. In practice, however, the filters must be lumped, usually with one filter associated with each amplifier in the transmission line. When Eq. 1) is integrated over any finite distance, it yields a Gaussian; thus, lumped filters corresponding to the simplest theory have Gaussian-shaped transmission response curves. For many practical reasons, however, it is customary to use etalon filters, whose free spectral range (FSR) is equal to the desired WDM channel spacing. For etalon filters with mirror spacing d and reflectivity R, and spaced along the transmission line by $L_f$ (once again, usually, $L_f = L_{amp}$, the amplifier spacing), elsewhere [8] we have given the following expression for $\eta$:

$$\eta = \frac{8\pi R}{(1-R)^2}\left[\frac{d}{\lambda}\right]^2 \frac{1}{cDL_f} \quad (2)$$

While the quantities on the right of Eq. (2) may be in any compatible units (such that the net result is "dimensionless"), the value for $\eta$ is in soliton units, i.e., it refers to the filtering effect per unit soliton distance ($z_c$) [9]. Note that because of this scaling, $\eta$ contains D, the fiber's dispersion parameter; this is the basis of the dilemma. That is, in Reference [8], we showed that the stability range (range of allowable soliton pulse energies for stable, error-free transmission) depends critically on $\eta$. In particular, for $\eta \sim 0.4$, that range is maximum (~3 dB), and it goes to zero as $\eta$ approaches 0.8. Thus, one important aspect for obtaining a good stability range in a guiding filter is to maintain $\eta \sim 0.4$.

In the mean time, the third order dispersion of dispersion-shifted fibers (typically, $dD/d\lambda \sim 0.07$ ps/nm²-km), when combined with the required wavelength span of >5 nm for more than 8 channels, tends to yield a range of D itself of more than 2 to 1, when the mean D in the WDM wavelength band has the most desired value of just a few tenths of a picosecond per nanometer-kilometer (nm/km). Thus, according to Eq. (2), within the context of extensive WDM, and when the filter mirrors have more or less constant R, it is difficult to keep $\eta$ always within the range for stable transmission, to say nothing of keeping it at the optimum value.

We note that for most practical etalon guiding filters, one has R<0.1, so that the simple factor of R in Eq. (2) dominates its R-dependence. That is for shallow (R<0.1) etalons $\eta$ R/D. Thus, it would seem that if one has simply R ($\lambda$) D ($\lambda$), then $\eta$ ($\lambda$) would be nearly constant. Thus, to compensate for the D ($\lambda$)-slope, the etalon filters should have a matching compensating variation R ($\lambda$).

Figure 2:
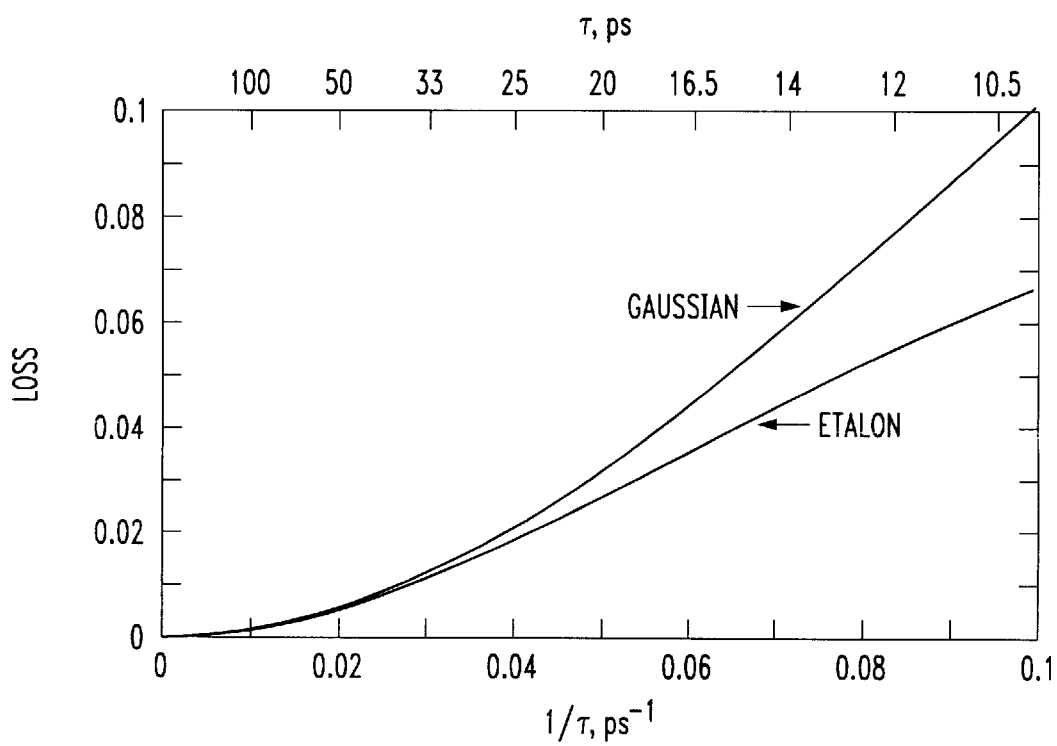
FIG. 2 shows an illustrative, filter induced, soliton fractional energy loss versus inverse pulse width.
Figure 3:
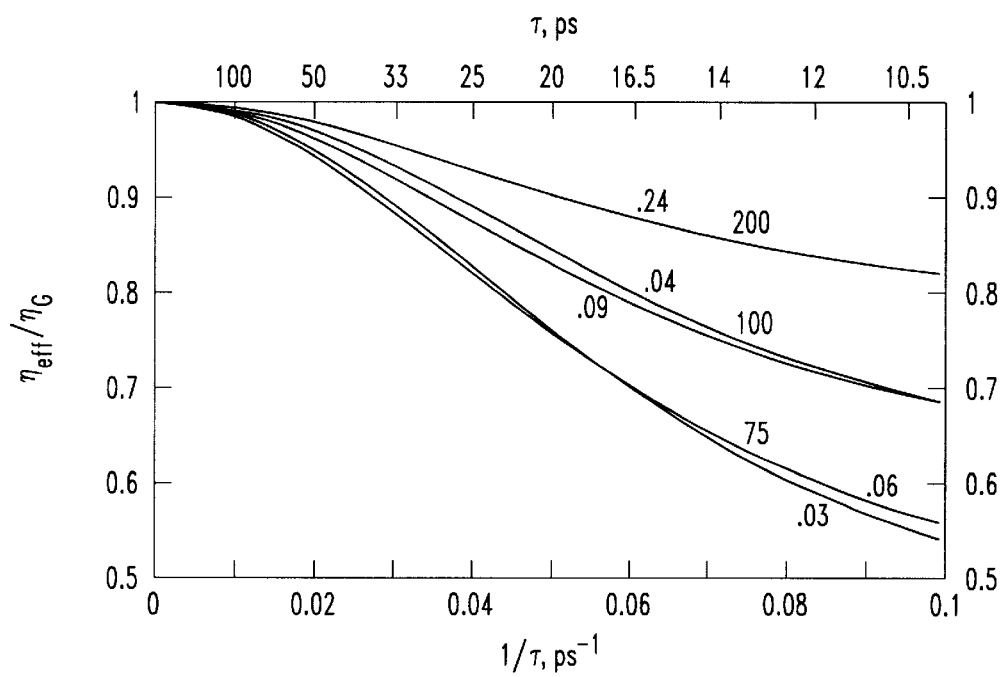
FIG. 3 shows an illustrative diagram of the effective strength ($\eta_{\mathit{eff}}$) of a etalon filter normalized to that ($\eta_G$) of a Gaussian filter.

The real story is somewhat more complicated. In the first place, the $\eta$ of Eq. (2) is really that of a Gaussian filter having the same curvature at its filter peak as that of the etalon. The effective strength of the etalon is always somewhat less than that of the "equivalent" Gaussian, however. This fact can be understood from FIG. 2, where we plot the loss in soliton energy, as a function of inverse pulse bandwidth, for one pass through both an etalon filter (R=0.06, FSR=75 GHz) and a Gaussian having the same peak curvature (same second derivative at the filter peak). Since the soliton's bandwidth is always in direct proportion to its energy, note that the derivatives of the curves of FIG. 2 are a measure of the filter strengths, at least in terms of their abilities to dampen energy fluctuations [1]. Thus, if $\eta_{eff}$ and $\eta_G$ refer to the etalon and Gaussian filters, respectively, the ratio $\eta_{eff}/\eta_G$ is just given by the ratio of the derivatives of the corresponding loss curves, such as those in FIG. 2. The ratio $\eta_{eff}/\eta_G$, which can be thought of as a correction factor to Eq. (2), is plotted in FIG. 3 for etalons of several different free spectral ranges and for several different mirror reflectivities. (In FIG. 3, the etalon and Gaussian filters have the same peak curvature and the data are shown for various combinations of etalon FSRs and mirror reflectivities, viz., 75 GHz: 0.03 and 0.06, 100 GHZ: 0.04 and 0.09, and 200 GHz: 0.24) Note that while the correction factor is only very weakly dependent on R, it is strongly dependent on the etalon's FSR. Also note that for the FSRs (channel spacing) usually required for massive WDM (75 or 100 GHz), and for the pulse widths typically employed ($\tau \sim 14$ –25 ps), the correction factor is substantial, and varies significantly with pulse bandwidth $1/\tau$).

Second, when D varies significantly over the WDM band, so does $\tau$ itself. That is, in conjunction with FIG. 6 of Ref. [8], we showed that for a fixed $\eta$, there is a unique, monotonic relation between the sliding rate, $\omega'_f$, as expressed in soliton units, and the soliton pulse energy; thus, choice of the optimum value for $W_{sol}$ implies a fixed value of $\omega'_f$. We also showed there that $$\omega'_f = 4\pi^2 \, f c t_c^3/(\lambda^2 D) \quad (3)$$

where $t_c = \tau/1.7629...$, and where f' is the frequency sliding rate, but as expressed in ordinary units, such as GHz/Mm. Note from Eq. (3) that constant $\omega'_f$ implies that $\tau$ scales as $D^{1/3}$. This variation in $\tau$, and the subsequent variation in $\eta_{eff}$ (FIG. 3), must be taken into account, along with Eq. (2), in the calculation of the etalon mirror R ($\lambda$) required to make $\eta_{eff}$ constant across an entire WDM wavelength band.

Figure 4:
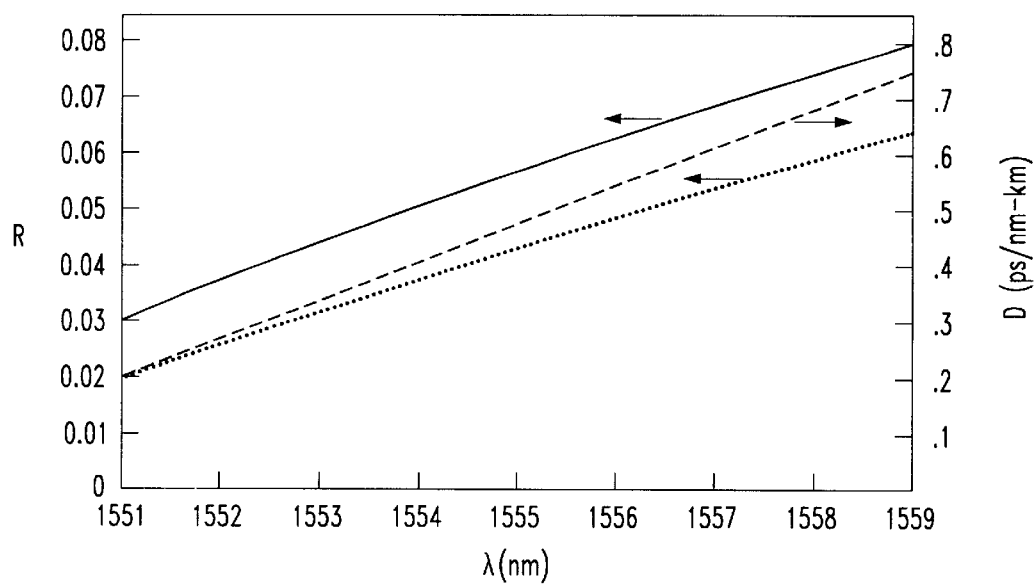
FIG. 4 shows etalon filter reflectivities as a function of wavelength.

The combined effect of the above-outlined factors can be best understood through a specific example. Consider 12 channels (at 10 Gbit/s per channel) with spacing 75 GHz (≈0.6 nm at 1550 nm), requiring a total WDM band of 7.2 nm, and let that band extend over the flat gain region of erbium fiber amplifiers from about 1551 to 1558 nm. For a dispersion slope 0.069 ps/nm$^2$-km, the $\Delta D$ over the 7.2 nm band is ~0.5 ps/nm-km. A reasonable corresponding range of D would be 0.2–0.7 ps/nm-km, from the short wavelength to the long wavelength ends of the band, respectively. According to the scaling cited above, that range in D would yield a range in $\tau$ of about 2:3, such that the pulse widths at the short and long wavelength ends of the band would tend to be $\tau$=14 and 21 ps, respectively. FIG. 4, solid curve, shows the computed curve of R($\lambda$) for etalon filters, having 75 GHz FSR, spaced 33 km apart, and yielding $\eta_{eff}$=0.4, for those conditions. The corresponding D($\lambda$) is shown by the dashed curve. The dotted curve of FIG. 4, is the corresponding R($\lambda$) calculated from Eq. (2) alone (without the correction factors for $\eta_{eff}$, like those of FIG. 2). Note that the variation in R over the band is not quite as great as that calculated from Eq. (2) alone. Note also that lowering the dispersion slope increases the available wavelength range and thus the number of channels, in inverse proportion to the slope, without changing anything else. Thus, for example, a halving of the dispersion slope would double the allowed number of channels, so that, at 10 Gbit/s per channel, the total capacity would be nearly ¼ Terabit/s.

Figure 5:
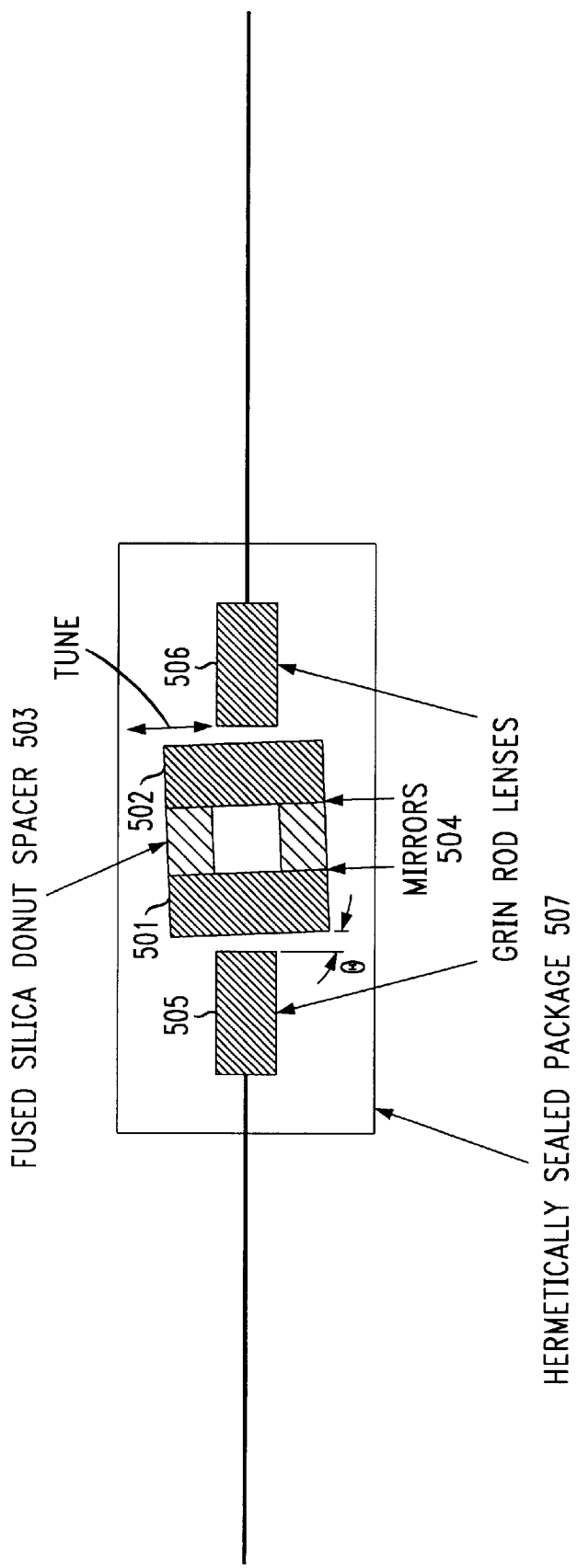
FIG. 5 shows an embodiment of an illustrative air gap etalon filter in accordance with the present invention.

The following paragraphs describe our method of producing variable-R etalon filters in a practical way. Shown in FIG. 5 is one embodiment of a practical stable guiding filter, in the form of an air gap etalon filter, made from two flats, 501 and 502, optically contacted to a fused silica "washer" shaped spacer 503. The facing surfaces of the optical flats have a multi-layer dielectric mirror coating formed thereon having the required mirror reflectivity variation with wavelength (d R/d $\lambda$). As shown the spacer 503, or air gap, has a thickness of 2 mm. The spacer 503 material is selected so that it has a temperature coefficient of expansion ($\alpha$) which insures that a predetermined temperature coefficient of frequency is not exceeded. The air-gap etalon unit (501–503) is placed between two wavelength dispersers, e.g., Grin rod lenses. The difference in spacing between the thickness of the air-gap etalon unit and the Grin rod lenses separation is >$\lambda$/2, this enables tuning by lateral displacement. The air-gap etalon unit is set at an angle, $\theta$, selected to insure that any optical signal emitted from Grin lens 505 can not be reflected by the optical flat 501 back to Grin lens 505, thus insuring a high optical signal return loss. For reliability purposes, the variable-R etalon filter unit should be hermetically sealed.

Figure 6:
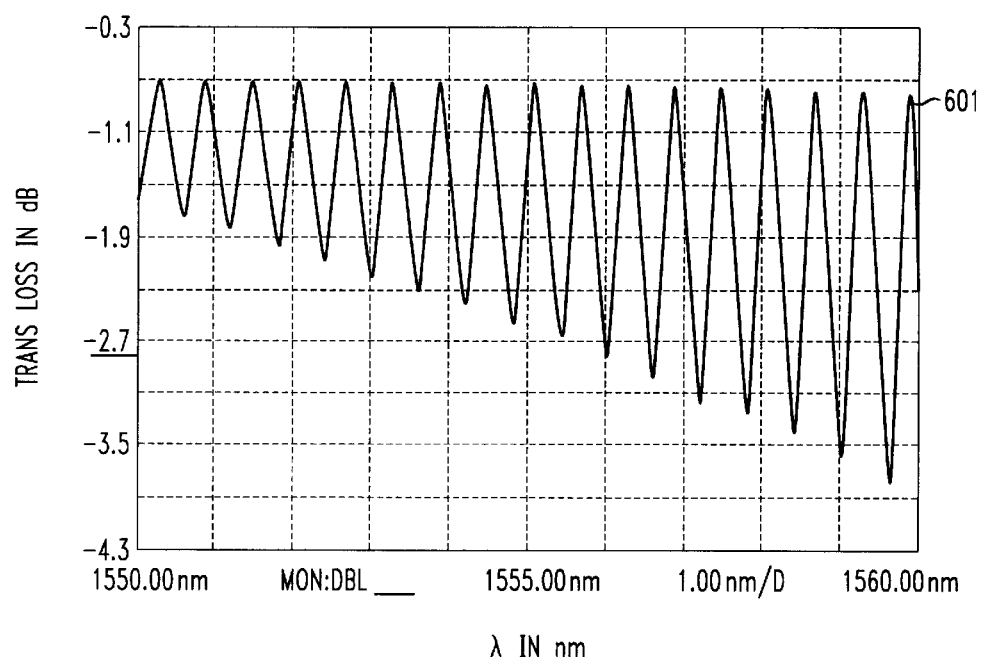
FIG. 6 shows the measured transmission loss of an air gap etalon filter.

Shown in FIG. 6 is an illustrative loss versus wavelength response of an etalon filter, FIG. 5, having the variable R($\lambda$) mirror coatings. The production of such coatings is described in the article of B. T. Sullivan et al entitled "Manufacture of complex optical multilayer filters using an automated deposition system" ISSP'97, June 97, Kanazawa, Japan. The transmission loss, in dB, variation with wavelength $\lambda$, 601 is shown to agree closely to the required characteristics (shown by the solid curve in FIG. 4) needed to compensate for the dispersion characteristics of the transmission fiber. It should be noted, that to reduce the loss response of the etalon filter the reflectivity R of each mirror should be the same. However, the etalon filter would still function, although at an increased loss level, if the reflectivity R of the two mirrors were different.

Figure 7:
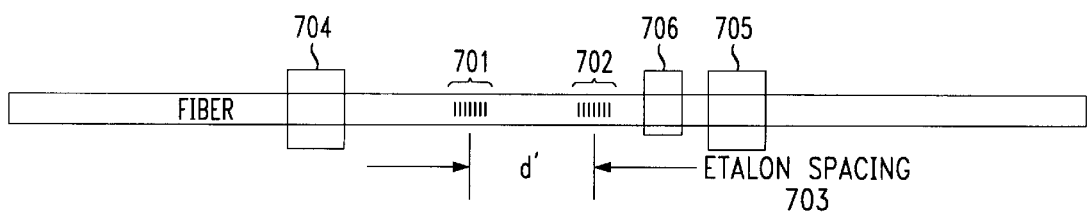
FIG. 7 shows another embodiment of an illustrative etalon filter using Bragg gratings in accordance with the present invention.
Figure 8:
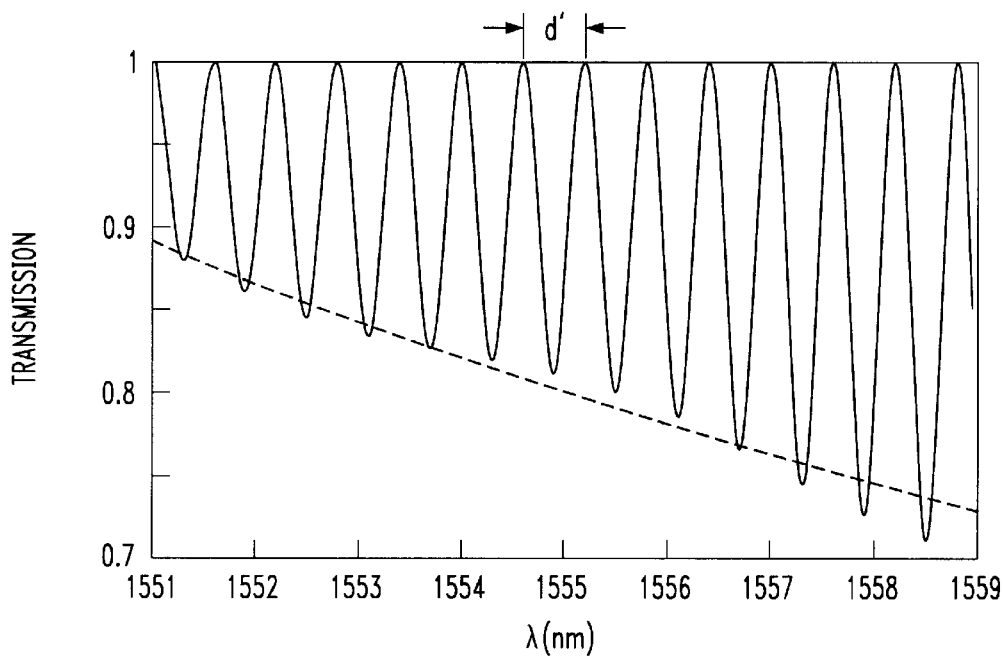
FIG. 8 shows the measured transmission loss of a fiber-grating etalon filter.

Shown in FIG. 7 is an alternate embodiment of a variable-R etalon filter formed by forming Bragg gratings written in fiber with UV (ultra-violet) light. Such an arrangement can act as mirrors whose curves of R($\lambda$) can be custom adjusted over a wide range of shapes and bandwidths, can be created with great reproducibility, and are stable with time for temperatures considerably in excess of any that might be encountered in transmission systems applications. Such a Bragg grating etalon filter can be created simply by fabrication of 2 nearly identical Bragg grating mirrors, 701 and 702, separated by exactly d', 703 (which is the fiber equivalent of the desired air-gap etalon mirror spacing, d, 504 of FIG. 5). When care is exercised to guarantee equal exposures of the two gratings, 701 and 702, the resultant etalon filter can be made to have exactly the same transmission characteristic as that of FIG. 6, i.e., one using conventional mirrors and having an air-gap d; this is true even when there is spatial overlap of the two gratings 701 and 702. FIG. 8 shows the measured transmission response curve of such an illustrative fiber-grating etalon filter. The behavior shown in FIG. 8 conforms closely to that dictated by the desired curve of R($\lambda$) of FIG. 4.

The only serious disadvantage of the fiber-grating etalon filters is that, unlike their non-fiber counterparts, their grating mirrors 701 and 702 cannot be easily tilted (used slightly off normal incidence) to yield a large return loss. Thus, they must be sandwiched between isolators, e.g., 704 and 705, to obtain a high return loss. Since, in any event, the system amplifiers (i.e., A of FIG. 1) use at least one isolator each, in practice this means the need to add one additional isolator per amplifier. Tuning, on the other hand, is not a problem. In practical systems, temperature tuning, preferably via miniature heaters intimately coupled to the fiber, would enable the development of filters which will accurately and dependably self-tune in conformity with a wide range of feedback control schemes.

Figure 9A:
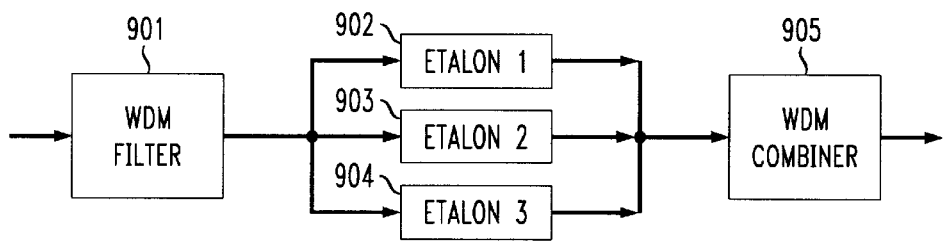
FIG. 9 (a) shows an illustrative arrangement of an etalon filter unit for splitting the soliton signal into a plurality of signal bands which are then separately filtered and FIG. 9(b) shows the split signal bands.
Figure 9B:
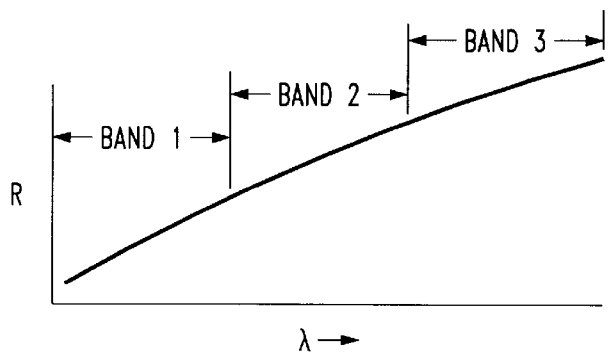

With reference to FIG. 9 (a) we shows an illustrative arrangement of an etalon filter unit for splitting the soliton signal into a plurality of signal bands which are then separately compensated. FIG. 9(b) shows the split signal transmission bands. Since compensation is done over a smaller transmission band, the band-limited etalon filters would enable a closer matching of the dispersion characteristics of the fiber in that band. As shown, illustratively, the transmission band can be split into a plurality of bands (bands 1–3 in FIG. 9(b)) using a wavelength selective filter 901. In one embodiment, the filter can be a well known wavelength grating router of the type described in the U.S. Pat. No. 5,136,671 issued to C. Dragone on Aug. 4, 1992. The dispersion in each wavelength band would then be compensated using a separate etalon filter, 902–904, in the manner previously discussed. A well known combiner 905 would then combine the corrected soliton signals from each of the band-limited etalon filters into a combined corrected soliton signal.

What has been described is merely illustrative of the application of the principles of the present invention. Other arrangements and methods can be implemented by those skilled in the art without departing from the spirit and scope of the present invention.

APPENDIX

REFERENCES

[1] L. F. Mollenauer, J. P. Gordon, and S. G. Evangelides, "The sliding-frequency guiding filter: an improved form of soliton jitter control," *Opt. Lett.* 17, 1575 (1992)

[2] L. F. Mollenauer, P. V. Mamyshev, and M. J. Neubelt, "Measurement of timing jitter in soliton transmission at 10 Gbits/s and achievement of 375 Gbits/s-Mm, error-free, at 12.5 and 15 Gbits/s", *Opt. Lett.* 19, 704 (1994)

[3] P. V. Mamyshev and L. F. Mollenauer, "WDM channel self-equalization in a soliton transmission line using guiding filters," *Opt. Lett.* 21,1658(1996)

[4] A. Mecozzi and H. A. Haus, "Effect of filters on soliton interactions in wavelength-division-multiplexing systems," *Opt. Lett.* 17, 988 (1992)

[5] L. F. Mollenauer, J. P. Gordon, and P. V. Mamyshev, "Solitons in High-Bit-Rate, Long-Distance Transmission," Chapt. 12 in *Optical Fiber Telecommunications IIIA*, I. P. Kaminov and T. L. Koch, eds., (Academic Press, 1997), Sec. 5.6.

[6] L. F. Mollenauer, P. V. Mamyshev, and M. J. Neubelt, "Demonstration of soliton WDM transmission at 6 and 7×10 GBit/s, error-free over transoceanic distances", *Electron. Left.* 32 471 (1996)

[7] L. F. Mollenauer, P. V. Mamyshev, and M. J. Neubelt, "Demonstration of soliton WDM transmission at up to 8×10 GBit/s, error-free over transoceanic distances", OFC-96, Postdeadline paper PD-22

[8] P. V. Mamyshev and L. F. Mollenauer, "Stability of soliton propagation with sliding frequency guiding filters," *Opt. Lett.* 19,2083, (1994)

[9] See Ref. 5, Sec. 2.4.2

We claim:

1. A method of making an etalon filter for use in filtering a Wavelength Division Multiplexed (WDM) soliton signal of an optical fiber system comprising the steps of:

determining how an average dispersion (D) parameter of the fiber varies with wavelength and calculating an appropriate variation in reflectivity (R) of each mirror surface of the etalon filter to provide for an approximately constant filter strength ($\eta$) parameter as a function of wavelength.

2. The method of claim 1 wherein $\eta$ is assumed to be approximately R/D, where R<<than 1.

3. The method of claim 1 wherein $\eta$ is assumed to be approximately R/D multiplied by a correction factor which varies as a function of the pulse width of the soliton signal.

4. The method of claim 1 wherein $\eta$ is assumed to be approximately R/D multiplied by a predetermined correction factor which varies as a function of $D^{1/3}$.

5. The method of claim 1 wherein the WDM signals are broken into multiple wavelength bands and within each band R is matched to the D parameter so as to maintain an essentially constant $\eta$.

6. An etalon filter for filtering a Wavelength Division Multiplexed (WDM) soliton signal received over an optical fiber, comprising a first mirror, having a first wavelength dependent reflectivity, for receiving the soliton signal, a second mirror, having a second wavelength dependent reflectivity and located a predetermined distance from the first mirror, the first and second mirror pair producing therefrom a corrected soliton signal and wherein said first and second reflectivities are selected so that the strength ($\eta$) parameter as a function of wavelength is approximately constant over all the wavelengths of the WDM soliton signal.

7. The etalon filter of claim 6 wherein said first and second reflectivities are the same.

8. The etalon filter of claim 7 wherein the received soliton signal is received over a first fiber segment and said corrected soliton signal is sent over a second segment, said reflectivity (R) characteristic is a mirror surface of a first and second elements, and the mirror surface of the first element is set at a non-normal predetermined angle to the longitudinal axis of the first fiber segment and the mirror surface of the second element set at a non-normal predetermined angle to the longitudinal axis of the second fiber segment.

9. The etalon filter of claim 7 wherein $\eta$ is assumed to be approximately R/D, where R<<than 1.

10. The etalon filter of claim 9 wherein $\eta$ is assumed to be approximately R/D multiplied by a correction factor which varies as a function of $D^{1/3}$.

11. The etalon filter of claim 6 wherein said first and second reflectivities is a characteristic of a mirror surface formed on said first and second mirrors, respectively.

12. The etalon filter of claim 6 wherein said first and second mirrors are surfaces of Grin lens.

13. The etalon filter of claim 6 wherein the mirror of the surface first and second elements are separated by a spacer having a low coefficient of thermal expansion.

14. The etalon filter of claim 13 being formed in a hermetically sealed package.

15. The etalon filter of claim 13 wherein the spacer is made from a fused silica material.

16. An etalon filter for filtering a Wavelength Division Multiplexed (WDM) soliton signal received over an optical fiber, comprising a first Bragg grating formed on the fiber, having a wavelength dependent reflectivity (R), for receiving the soliton signal, a second Bragg grating formed on the fiber, having said wavelength dependent reflectivity (R) and located a predetermined distance from the first Bragg grating, the first and second Bragg gratings producing therefrom a corrected soliton signal and wherein said reflectivity (R) characteristic is selected so that the ratio of R/D, where D is an average dispersion (D) parameter over the fiber, remains essentially constant over all the wavelengths of the WDM soliton signal.

17. An etalon filter apparatus for filtering a Wavelength Division Multiplexed (WDM) soliton signal received over an optical fiber, comprising a WDM filter for splitting the soliton signal into a plurality of signal bands, each signal band being filtered by a separate etalon filter unit including a first mirror having a wavelength dependent reflectivity (R) characteristic, for receiving the soliton signal, a second mirror having said wavelength dependent reflectivity (R) characteristic and located a predetermined distance from the first mirror, the first and second mirror pair producing therefrom a corrected soliton signal and wherein said reflectivity (R) characteristic is selected so that the strength ($\eta$) parameter as a function of wavelength ratio is approximately constant over all the wavelengths of the band, and a WDM combiner for combining the corrected soliton signals from each of etalon filter units into a combined corrected soliton signal.

* * * * *